UNITED STATES PATENT OFFICE.

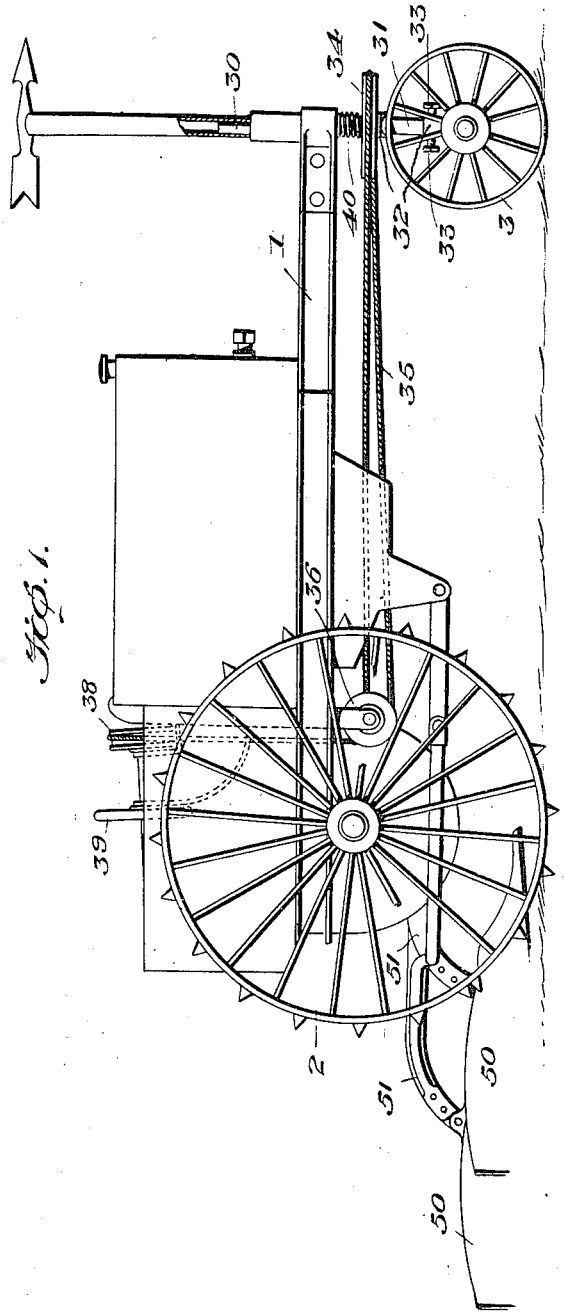
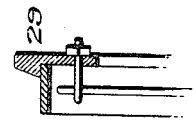
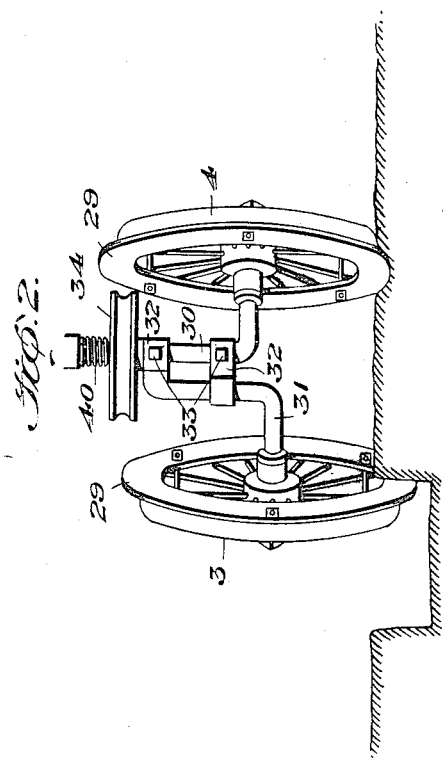

CLARENCE W. JACKSON, OF DUNKIRK, MONTANA, ASSIGNOR OF FIFTY-FIVE ONE-HUNDREDTHS TO DAVID F. MAINS AND TWENTY-TWO AND ONE-HALF ONE-HUNDREDTHS TO ALVIN D. RIEDER, BOTH OF VALIER, MONTANA.

STEERING-WHEEL FOR TRACTOR AGRICULTURAL MACHINES.

1,195,359.　　　　　　　　Specification of Letters Patent.　　Patented Aug. 22, 1916.

Application filed May 3, 1915.　Serial No. 25,598.

*To all whom it may concern:*

Be it known that I, CLARENCE W. JACKSON, a subject of Great Britain, (who has declared his intention of becoming a citizen of the United States,) residing at Dunkirk, county of Toole, and State of Montana, have invented certain new and useful Improvements in Steering-Wheels for Tractor Agricultural Machines, of which the following is a specification.

This invention relates to steering wheels for tractor agricultural machines.

My object is to provide an improved arrangement of steering wheels, adapted for use on any tractor agricultural machine, comprising those features and combinations hereinafter set forth and recited in the appended claims.

In the accompanying drawings: Figure 1 is a side elevation showing my improvements applied to a tractor agricultural machine; Fig. 2, a detail view showing the construction and operation of the guiding and steering wheels; and Fig. 3, a detail section showing the manner of securing one of the flanges thereof.

The machine has a frame 1 which is supported by rear traction wheels 2 and my improved steering or guide wheels 3 and 4. The steering and guiding wheels 3, 4 have flat tires and are provided with detachable flanges 29 secured to the spokes by hook-clamps. When the machine is used as a tractor, these flanges are removed, but when employed as a plow or plow and seeder, the wheel 3 is adapted to run in the furrow, as shown in Fig. 2, and the wheel 4 to travel on the unplowed land. The wheel 4 is mounted on the spindle of a shaft or standard 30 which is journaled in the front of the frame 1. The wheel 3 is journaled on the spindle of a bracket 31 which has eyes 32 receiving the standard 30 but adapted to be slid up or down thereon or turned, with the bracket 31 and wheel 3, to different positions and secured by set screws 33 adapted to impinge on the standard 30. The adjustable mounting thus provided enables the wheel 3 to be disposed with its periphery lower than the periphery of the wheel 4 and arranged so that the flange 29 and the tire of the wheel 3 will enter the furrow, but will not touch the bottom thereof, as shown in Fig. 2, while the wheel 4 will, at the same time, run on the surface of the unplowed portion of the land. Furthermore, as the eyes 32 are adapted to be turned on the standard 30 and secured by the screws 33, the plane of the wheel 3 can be so disposed that the wheel 3 may be arranged in a plane converging rearwardly in relation to the plane of the wheel 4, that is to say, the rear parts of the wheels 3 and 4 will be closer together than the front parts thereof. With the wheels 3 and 4 thus adjusted, the wheel 3 will run in the furrow without touching the bottom thereof and, consequently, will act in a disking fashion and endeavor to move away from the furrow and ride on the unplowed land, but the said wheel 3 cannot get out of the furrow because it would thereby lift the wheel 4 off the ground and consequently, this combination of wheels constitutes a self-steering apparatus and the machine follows the furrow to its end as the wheel 3 always remains in the furrow. A steering sheave 34 is secured to the standard 30 and operated by a cable 35 running over the sheaves 36, 37, 38 operated by a steering wheel 39 positioned conveniently for the driver. Surrounding the standard 30 and interposed between the sheave 34 and the frame 1 is a coil spring 40 whereby the front of the frame is cushioned to absorb shocks. The steering mechanism provides means whereby the steering wheels may be turned at any time, as for instance, at the end of the furrow and during other operations when the machine is not guiding itself.

When the machine is used as a tractor, the flanges 39 are removed and the bracket 31 adjusted so that the spindles of wheels 3 and 4 are in alinement and the tops of said wheels are then on the same level.

To enable the machine to turn within a short radius so as to plow a square corner, means may be provided for cramping or arresting either one of the wheels 2. By turning the wheels 3, 4, nearly crosswise in relation to the frame 1, and cramping one of the wheels 2, the machine will very completely plow a square corner of a field. I am thereby enabled to readily plow all parts of a square field and thus save on time, work, and fuel and oil consumption.

The plows 50 may be of any preferred form and are carried by beams or standards 51.

Having thus described my invention, what I claim as new and desire to secure by Letters Patent, is:—

1. In an agricultural machine or tractor, the combination with a frame, of rear traction wheels, front steering and guide wheels, a standard supporting said frame and having a spindle on which one of said wheels is mounted, said spindle being adapted to turn, a bracket having a spindle on which the other steering or guiding wheel is mounted, said bracket being vertically adjustable and rotatably mounted on said standard, and means for securing said bracket at different heights and different positions of lateral adjustment on said standard.

2. In an agricultural machine or tractor, the combination with rear traction wheels, of a frame, a steering standard rotatably mounted on the frame, means for turning said standard at will to effect steering, a steering and guiding wheel carried by said standard, a bracket rotatably mounted on said standard and also vertically slidable thereon, means for securing said bracket to said standard to dispose the bracket in different desired vertical and lateral positions, and a guiding and steering wheel mounted on said bracket.

In testimony whereof, I hereunto affix my signature in presence of two witnesses.

CLARENCE W. JACKSON.

Witnesses:
FRANK KITCHEN,
H. P. KALBFLEISCH.